(12) United States Patent
Thiel (10) Patent No.: US 12,385,831 B2
(45) Date of Patent: Aug. 12, 2025

(54) THz MEASURING DEVICE AND THz MEASURING METHOD FOR MEASURING A TRANSPORTED MEASURING OBJECT

(71) Applicant: CiTEX Holding GmbH, Melle (DE)

(72) Inventor: Marius Thiel, Osnabrück (DE)

(73) Assignee: CiTEX Holding GmbH, Melle (DE)

( * ) Notice: Subject to any disclaimer, the term of this patent is extended or adjusted under 35 U.S.C. 154(b) by 193 days.

(21) Appl. No.: 17/953,586

(22) Filed: Sep. 27, 2022

(65) Prior Publication Data

US 2023/0095853 A1 Mar. 30, 2023

(30) Foreign Application Priority Data

Sep. 28, 2021 (DE) ................. 10 2021 125 111.7

(51) Int. Cl.
*G01N 21/3581* (2014.01)
*G01B 11/06* (2006.01)
*G01N 21/95* (2006.01)

(52) U.S. Cl.
CPC ..... *G01N 21/3581* (2013.01); *G01B 11/0625* (2013.01); *G01N 2021/9511* (2013.01)

(58) Field of Classification Search
CPC ....... G01N 21/3581; G01N 2021/9511; G01N 21/8903; G01N 21/892; G01N 2021/8925; G01N 21/4133; G01N 21/3563; G01B 11/0625; G01B 11/0691
USPC ........................................ 356/432
See application file for complete search history.

(56) References Cited

U.S. PATENT DOCUMENTS

| 2018/0112973 A1 | 4/2018 | Sikora |
| 2021/0114278 A1 | 4/2021 | Holle |

FOREIGN PATENT DOCUMENTS

| DE | 102014214046 B3 | 10/2015 |
| DE | 202016008526 U1 | 5/2018 |
| DE | 102017114879 A1 | 1/2019 |
| DE | 102017125740 A1 | 5/2019 |
| DE | 102018104705 B4 | 3/2020 |
| DE | 102019109340 A1 | 10/2020 |
| DE | 102019119491 A1 | 1/2021 |

OTHER PUBLICATIONS

European Search Report for EP22198246 mailed Feb. 15, 2023, 2 pages.

*Primary Examiner* — Md M Rahman
(74) *Attorney, Agent, or Firm* — Barnes & Thornburg LLP (57) ABSTRACT

The present disclosure relates to a THz measuring device for measuring an extruded measuring object.

24 Claims, 2 Drawing Sheets

THz MEASURING DEVICE AND THz MEASURING METHOD FOR MEASURING A TRANSPORTED MEASURING OBJECT

PRIORITY CLAIM

This application claims priority to German Patent Application No. DE 10 2021 125 111.7, filed Sep. 28, 2021, which is expressly incorporated by reference herein.

BACKGROUND

The present disclosure relates to X, and particularly to Y. More particularly, the present disclosure relates to Z.

The present disclosure relates to a Terahertz (THz) measuring device and a THz measuring method for measuring a transported measuring object, e.g. an extruded string or an extruded blow film.

SUMMARY

According to the present disclosure, a THz measuring device and a THz measuring method allow for a secure measuring of a transported measuring object with little expense. This is provided by a THz measuring device and a THz measuring method according to the independent claims. The sub-claims describe preferred further developments. Further, an arrangement consisting of the THz measuring device and the extruder, preferably further including a calibration sleeve, is provided.

Die THz radiation may lie, in particular, within the frequency range between 10 Gigahertz (GHz) and 50 THz, in particular 10 GHz and 10 THz, in particular 20 GHz and 3 THz, preferably 50 GHz and 1 THz.

Thus, the THz radiation may even extend into the range of radar radiation and/or microwave radiation. The THz radiation may be emitted and detected, in particular, as direct time-of-flight measurement and/or using frequency modulation and/or as pulsed radiation.

The individual THz transceivers may even emit THz radiation in different frequency ranges or, respectively, overlapping frequency ranges.

The second mirror means is arranged offset along the longitudinal axis in relation to the first mirror means. This in particular means that the second mirror means is displaced with respect to the first mirror means along a direction which corresponds to the longitudinal axis.

Thus, the THz measuring device comprises a plurality of THz transceivers arranged around a longitudinal axis the axes of which are each oriented radially inwards, in particular, towards the optical axis. Thus, THz radiation is coupled-in from outside through the measuring object towards the inside.

Furthermore, it is provided to form static mirror arrays, wherein, advantageously, no rotating or revolving components, in particular, no rotating mirrors are provided. Thus, the plurality of THz transceivers arranged around the longitudinal axis or the measuring object respectively each send their transmitted beam inwards through the measuring object each towards a first deflecting mirror having a first mirror means, the first deflection mirrors, e.g. oriented at an angle of 45°, each reflect the transmitted beam along the longitudinal axis of the measuring object or the measuring device respectively so that it reaches a second deflection mirror of a second mirror means. Thus, the first mirror means and the second mirror means are offset with respect to one another in the direction of the longitudinal axis. The second deflection mirror reflects the transmitted beam running along the longitudinal axis again radially outwards, e.g. at an angle of 90 degrees, so that the beam penetrates the wall of the measuring object from within towards the outside.

Hereby, the transmitted beams deflected by the first deflection mirrors may run, in particular, parallel to the longitudinal axis; however, they may also run at an angle slightly inclined with respect to the longitudinal axis if this is compensated accordingly by the second deflection mirrors such that the second deflection mirrors are adapted accordingly to then deflect the transmitted beams into the radial direction.

The radial direction of the optical axes of the THz transceivers and the radial direction of the radial beams deflected by the second deflection mirrors may each run exactly perpendicular to the longitudinal axis, i.e. exactly in a radial plane perpendicular to the longitudinal axis; however, they may also run e.g. inclined with respect to the radial plane if this is compensated accordingly by the other mirrors. Thus, e.g., a third mirror means may be adapted to reflect the radial beams running not exactly perpendicular to the longitudinal axis back again to the second deflection mirrors, Thus, the present disclosure, owing to the offset of the measuring plane in relation to the transceiver plane, allows for a purposeful measuring of regions along the longitudinal axis in which the shape of the measuring object is changed or not yet finished. Thus, pipes during and after extrusion sometimes still run curved or arched because the diameter of the plastic mass may e.g. still be shrinking; here, too, according to an aspect of the present disclosure, a measuring of the extruded measuring object can be carried out in such a region where the boundary surfaces do not yet run parallel to the longitudinal axis, in that the transmitted beam or radial beam respectively is emitted correspondingly not exactly perpendicular to the longitudinal axis so that, preferably, it passes the boundary surfaces of the measuring object perpendicularly. Thus, the measuring plane in such an embodiment may exhibit e.g., even a slightly conical shape.

According to an advantageous embodiment, on the outside, i.e. in particular outside the measuring object, a third mirror means is provided which reflects the emitted beam back so that the beam advantageously returns in the same manner, i.e. from the third mirror means through the measuring object to the second mirror means, thereafter along the longitudinal axis to the first mirror means and back towards the THz transceiver of the THz measuring device.

In principle, instead of a third mirror means it is possible to carry out another type of measurement in the second plane; thus, e.g., a reflection may happen at the measuring object itself so that the second mirror means will then guide the so generated reflected beams back to the first mirror means.

Thus, each THz transceiver forms a separate THz measuring beam each carrying out a measurement via the two deflection mirrors, preferably also via the third mirror means.

The measuring object is preferably a string, in particular a pipe, a profile or a sheet.

The design according to the present disclosure produces certain advantages.

First of all, it is possible to entirely do without rotating components. Hereby, in particular, it is recognised that even the making of rotating mirrors and similar rotating components is associated with a high degree of wear and inaccuracies. On the one hand, a mirror rotating in the area of the longitudinal axis will be able to carry out a revolution in a relatively short time, and no rail means are used outside the measuring object as would be in the case of an outside revolving sensor. However, within the string, e.g. pipe, in particular also in the area of the extruder and the exit area of the extruder, the temperature will be very high leasing to a strain on the rotating parts and their bearings so that the strain and wear will be high, with temperature differences even leading to inaccuracies in guiding the mirrors due to tolerances. Another problem here are severe restrictions as regards installation space, in particular, for transmitting motion energy of any kind to the rotation unit as well as individually made adaptations of an extruder following there from.

The static design according to the present disclosure, on the other hand, allows for a secure, durable and reproductive measurement.

On the one hand, due to a plurality of deflection mirrors, the initial cost of materials is somewhat higher than in the case of a single rotating mirror; however, less wear and also the omission of a rotational drive will lead to cost advantages while achieving a higher degree of measuring accuracy. In addition to that, advantageously, the solution according to the present disclosure including static mirrors without the need for moving parts in the extruder area can be retrofitted in a simple manner.

According to the present disclosure, advantageously, the THz transmission beam is firstly coupled in firstly from outside through the measuring object, i.e., e.g. the pipe wall or wall of the string respectively, to reach the interior space, whereupon the deflections and the measuring happens from inside towards the outside. By positioning the THz transceivers outside the measuring object, it is possible to utilise systems with higher transmission output which, in particular, are also strained to a lesser extent both thermally and as regards soiling as well as burnup. Moreover, a measurement is possible as early as the first passage of THz radiation from outside towards the inside through the measuring object, e.g. the pipe wall, and this can be subsequently revaluated, in addition to the second measurement. Thus, according to the present disclosure, it is possible to measure the wall of the measuring object in two regions offset from one another in the direction of the longitudinal axis, whereby partial reflections at the walls can be detected in a single measuring signal and evaluated separately.

A further advantage according to the present disclosure lies in a possible calibration of the system. Thus, it is possible to first carry out an empty measurement or calibration measurement respectively, in which the time of flight from the THz transceivers to the third mirror means is determined, since the third mirror means delivers a total reflection peak. Because the design according to the present disclosure is static this calibration measurement can be compared to a subsequent measurement at the measuring object. In the subsequent object measurement, the partial reflections at the boundary layers and the total reflection at the third mirror means are detected so that the times of flight to the total reflection between the calibration measurement and the object measurement ca be compared. By virtue of this comparison, it is possible to carry out an additional determination of a refraction index, in addition to the measurement of layer thicknesses, because an equation system from both measurements can be set up. This determination can be carried out using the calculations described above.

Preferably, it is recognised that the cost of hardware for the third mirror means is small because this can be provided offset in an axial direction with respect to the THz measuring device, i.e. even in the area of the extruder, in particular, even at the calibration sleeve or, respectively, an extension of the calibration sleeve. Thus, possibly, no additional cost of hardware is used for the third mirror means. Thus, it is also possible to measure the measuring object in the area of the calibration sleeve or, respectively, within the calibration sleeve, whereby the material of the extruded measuring object will still be molten at higher temperatures so that it is possible to determine the subsequently cooled-off measuring object even with understood shrinkage or, respectively, to carry out, together with an additional THz measuring device provided further downstream in the extrusion line, a precise determination of the shrinkage from the molten material to the cooled-off measuring object. Thus, even a THz measuring device arranged outside the calibration sleeve is able to provide a measurement in the area of the calibration sleeve so that there can be a spatial separation and the THz measuring device with its THz transceivers may be positioned at a distance from the extruder which bears a lower temperature load.

Instead of the calibration sleeve, a reference hood may be provided as third mirror means, the hood extending outside the measuring object so that free space remains between the measuring object and the reference hood. This can provide, in particular, that the partial reflection peak of the beam impinging from the inside onto the exterior surface can be securely separated from the total reflection peak at the third mirror means.

It is apparent that the arrangement of a plurality of THz transceivers allows for a complete or nearly complete measuring of a measuring object even without any rotational drive and rotating parts.

The present disclosure further provides for an extrusion method including an immediate regulation of the extrusion parameters of the extruder because, using the THz measuring method, a secure determination of the properties of the measuring object is carried out during or after the extrusion.

The determined properties of the measuring object are one or more of the following properties:

a layer thickness of the measuring object at various spots of the longitudinal axis and/or various spots of the circumference, i.e. in particular along the longitudinal axis, e.g. continuously along the longitudinal axis, preferably fully in the circumferential direction; thereby, preferably, a complete measuring of the measuring object is carried out.

a refraction index of the measuring object or, respectively, the speed of light in the measuring object, thereby gathering information on the material characteristics, inclusions of air and other substances in the measuring object (2), in particular shrinkage cavities and/or inclusions from burn-up in the measuring object, with burn-up at the interior and exterior surface of the measuring object to be understood also as a substance in the measuring object, irregular formation of boundary surfaces (2-1, 2-2) and formations of boundary surfaces (2-1, 2-2) of the measuring object (2) running non-parallel to the longitudinal axis (A), e.g. sagging and deformation, whereby, e.g., a certain degree of sagging may be considered acceptable.

The individual THz transceivers and the first deflection mirrors may each be arranged within the same measuring plane. Thus, the result is a first measuring plane of the THz measuring device with its THz transceivers and the first deflection mirrors of the first mirror means.

Furthermore, the second deflection mirrors of the second mirror means may also be provided in a common second plane allowing a more thoroughly circumferential measurement of the measuring object in this second measuring plane. This common arrangement in the longitudinal direction allows, in particular, the mirror means to be designed compact.

Alternatively, however, the first and/or second deflection mirrors may be provided in an axial direction, i.e., along the longitudinal axis, offset against one another, so that e.g., no common first measuring plane and/or no second direction measuring plane is formed. This allows measurements to be carried out by the individual elements in convenient locations when space is at a premium, in particular, even in the area of the extruder and the calibration sleeve as well as potentially further means, without the requirement of a common plane for positioning. This advantage is created, in particular, also by the separate design of THz transceivers and first and second deflection mirrors, and constitutes a further advantage, in particular, compared to the aforementioned design involving a common rotating mirror.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
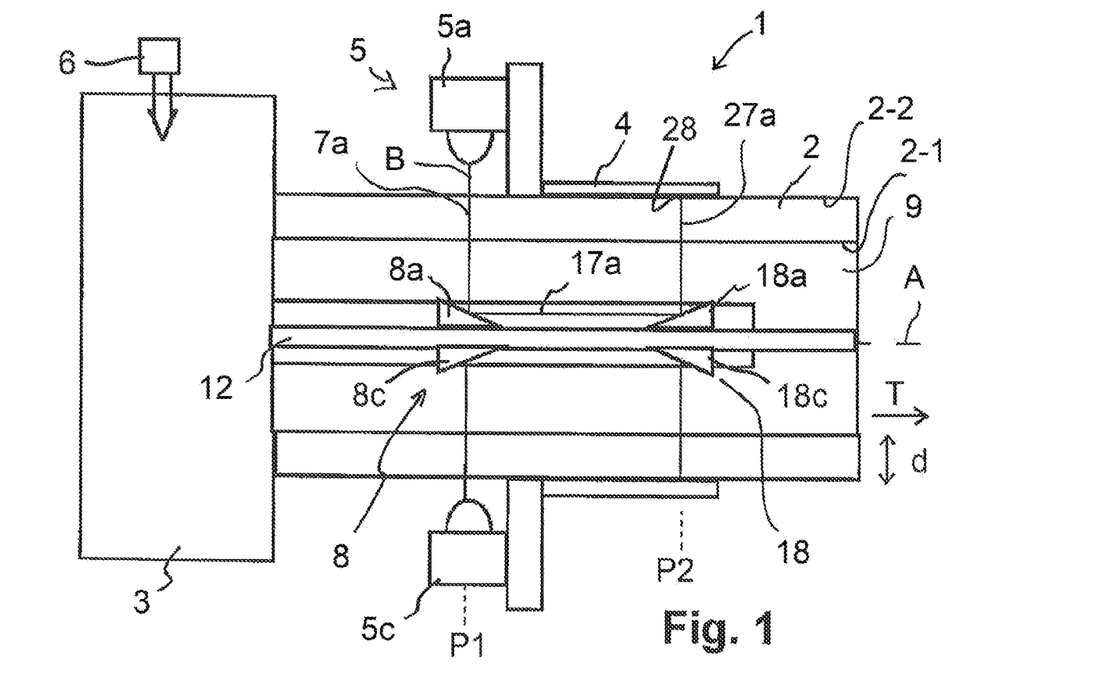
FIG. 1 shows an arrangement according to a first embodiment of the present disclosure in a sectional view along the longitudinal axis.

An arrangement 1 serves to extrude and measure measuring objects which may be, in particular, strings, e.g. pipes 2, or blow films. In the following, the arrangement will be illustrated by way of example by means of a pipe 2. The arrangement 1 comprises an extruder 3, a calibration sleeve 4, and a THz measuring device 5 for measuring the extruded pipes 2. The extruder 3 is fed with a starting material 6, in particular plastics and/or rubber, possibly including additives or as a mixture of various starting materials, in particular, as bulk material such as e.g., pellets, grains etc. The extruder 3 melts the starting material 6 and puts out the pipe 2 or, respectively, the tube-shaped string in a transport direction T. The pipe 2 is subsequently extracted, in particular, by means of an extractor device and cooled in a cooler device. Hereby, the pipe 2 is guided essentially along a transport axis A which forms the axis of symmetry of the arrangement. The molten material put out by the extruder 3 is calibrated by the calibration sleeve 4, i.e. brought into the pre-determined tube shape, whereby additional elements may be provided for calibration purposes. In contrast to what is shown in FIG. 1, the extruded string may generally still exhibit a deviating shape upstream from the calibration sleeve 4.

The THz measuring device 5 comprises a plurality of THz transceivers 5a, 5b, 5c and 5d the respective optical axes B of which are directed radial inwards towards the extruded pipe 2, in particular, towards the longitudinal axis A. The THz transceivers 5a-d each put out a THz transmission beam 7a, 7b, 7c, 7d along their optical axes B which lies, in particular, within a frequency range between 10 GHz and 10 THz, and directly or indirectly serves a time-of-flight measurement, e.g., as a direct time-of-flight measurement, and/or as a frequency modulated beam, and/or as pulsed radiation.

In the interior space 9 of the pipe 2 a first mirror means 8 is provided around the longitudinal axis A which includes a first deflection mirror 8a, 8b, 8c, 8d for each THz transmission beam 7a-7d. each first deflection mirror 8a-8d is designed as a planar mirror surface or, respectively, comprises a planar mirror surface extending e.g. at an angle of 45° in relation to both the longitudinal axis A and the respective optical axis B thereby deflecting the respective THz transmission beam 7a-7d along, e.g. parallel, to the longitudinal axis A. Thus, the THz transmission beam 8a-8d will subsequently run along the longitudinal axis A, e.g., as a lengthwise parallel transmitted beam 17a-17d, and subsequently reaches the second mirror means 18 which in turn comprises, correspondingly, a plurality of second deflection mirrors 18a-18d. The second deflection mirrors 18a-18d are essentially arranged in a manner mirror-symmetric to the first deflection mirrors 8a-8d, i.e. as an inclined mirror surface or, respectively, comprising an inclined mirror surface, which again deflects the lengthwise parallel transmitted beams 17a-17d each radially outwards, e.g. by an angle of 90° and, therewith, perpendicular to the longitudinal axis A so that they each form a radial reflected beam 27a-27d which, thus, runs radially from within towards the outside and passes through the pipe 2 from within in a rear measuring plane P2.

The two mirror means 8 and 18 may be affixed e.g. to a supporting rod 12 extending in the longitudinal axis A which is attached to the extruder 3 or, respectively, in the area of the extruder 3 to a further holding device. The extrusion of the pipe 2 will not be affected by the supporting rod 12 and the mirror means 8, 18.

Outside the pipe 2 a third mirror means 28 is provided which, according to the embodiment according to FIG. 1, is formed by the calibration sleeve 4 itself or formed at the inside of the calibration sleeve 5, e.g., as a smooth reflective layer. Thus, in principle, the calibration sleeve 4 made from metal may itself serve as third mirror means 28. The third mirror means 28 reflects the radial reflected beams 27a-27d back by 180° each so that they in turn travel through the pipe 2, the interior space 9 of the pipe 2 towards the second mirror means 18, subsequently run accordingly along the longitudinal axis A, be reflected at the first mirror means 8 and run back along the optical axis B of their respective THz transceivers 5a-5d, thereby again passing through the pipe 2 and be detected by the respective THz transceiver 5a-5d.

Thus, each THz transceiver 5a-Sd records a measuring signal Sa-Sd representing the reflection or partial reflections respectively at the respective boundary surfaces and mirror surfaces: Thus, the THz transmission beam 7a, according to FIG. 1 left side, will first pass through the front region of the pipe 2, whereby here in this region of the pipe 2 upstream from the calibration sleeve 4 there may be no boundary surfaces perpendicular to the optical axis B. The downstream mirror means 8, 18 produce no reflection peak; subsequently, partial reflection peaks will appear in the measurement signals Sa-Sd when the respective radial reflected beam 27a-27d passes through the interior boundary surface 2-1, and when it subsequently, after passing the pipe 2, passes through the exterior surface 2-2. Further, a total reflection peak will appear at the calibration sleeve 4 or, respectively, the third mirror means 28. Upon subsequent passing this beam path, there will again appear corresponding reflection peaks at the boundary surfaces 2-2 and 2-1, both in the rear measuring plane P2 and the front measuring plane P1.

Prior to measuring a pipe 2 it is possible, prior to the extrusion, i.e., when the measuring space is empty, to first carry out an empty measurement or calibration measurement respectively, where, consequently, there will be no partial reflection peaks present at boundary surfaces 2-1 and 2-2 in the measuring signals and only a total reflection peak will appear upon total reflection at the third mirror means 28. Thus, the times of flight t28a-t28d of the THz beams 7a-7d of the sensors 5a-5d to the third mirror means 28 can be determined while the measuring space is empty.

By virtue of the fact that an object measurement with the pipe 2 is carried out subsequently, it is possible to determine, in addition to the partial reflection peaks, the respective total reflection peak at the third mirror means 28. Thus, it is possible to determine a total time delay caused by passing the pipe wall of the pipe 2 twice from the difference of the time of flight t28a of the object measurement of the pipe 2 and the corresponding time of flight t28a of the calibration measurement, in addition to the time of flight differences between the boundary surfaces 2-1 and 2-2. From the total time of flight delay and the time of flight differences between the boundary surfaces 2-1 and 2-2 both the layer thickness of the pipe 2, in particular in both measuring planes P1 and P2, and the refraction index n2 of the material of the pipe 2 can be determined.

Figure 2:
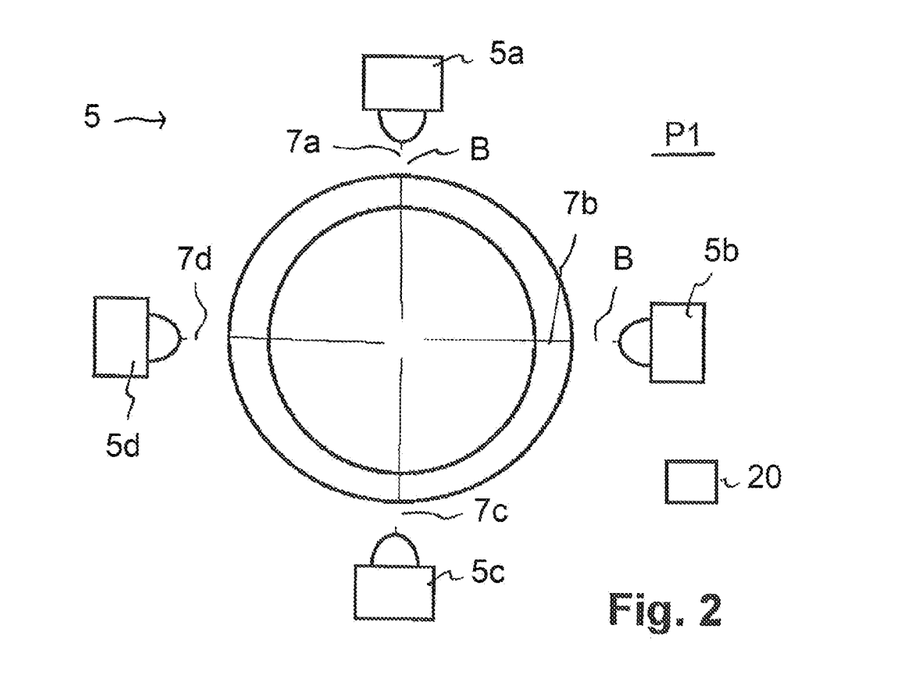
FIG. 2 is a sectional view perpendicular to the longitudinal axis of the arrangement from FIG. 1 in the first measuring plane.
Figure 3:
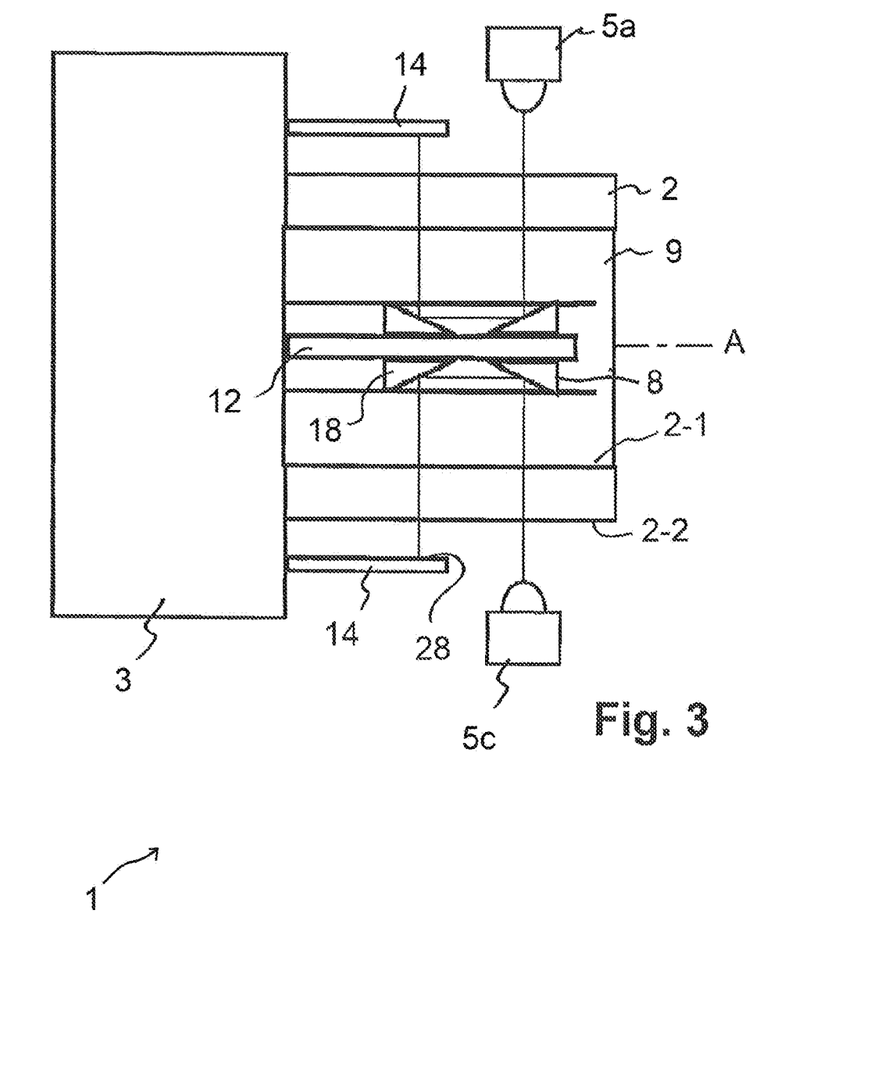
FIG. 3 shows an arrangement according to an arrangement altered in comparison to FIG. 1.

In the embodiment according to FIG. 3, in principle, a measurement according to that in FIG. 1 is carried out. Hereby, however, the third mirror means 28 is formed not at the calibration sleeve 4 but, rather, at a reference hood 14 spaced apart from the pipe 2 in a radial direction. Thus, here, a significant separation of the signals of the partial reflection peaks at the exterior surface 2-2 and the total reflection peak at the third mirror means 28 is provided which is advantageous in terms for the measurement. Furthermore, the position reference hood 14 can be chosen independent from the position of the calibration sleeve 4. The sectional view along the longitudinal axis A in the embodiment of FIG. 3 again corresponds to the representation of FIG. 2, i.e., in the first measuring plane P1.

The first mirror means 8 and the second mirror means 18 are arranged separate in the longitudinal direction or, respectively, along the longitudinal axis A and symmetrically or, respectively, in mirror symmetry in relation to one another. In both embodiments, according to FIG. 1 as well as to FIG. 3, the positions in relation to the transport direction T can be chosen freely. In FIG. 1, the second mirror means 18 lies further outward in the transport direction T, i.e., away from the extruder 3 or tool respectively, and offset against the first mirror means 8. In this embodiment, too, an opposite design may be chosen in which, consequentially, the first mirror means 8 is farther apart from the extruder 3 than the second mirror means 18. Thus, in that case, the THz measuring device 5 is provided behind the calibration sleeve 4, i.e. farther apart from the extruder 3.

Correspondingly, in the embodiment of FIG. 3, the position of the reference hood 14 can also be selected such that is arranged farther away from the extruder 3 than the THz measuring device 5, i.e., in a beam path configuration reversed in relation to FIG. 3.

Alternative to the formation of common measuring planes P1 and P2, however, it is also possible to have the THz transceiver 5a-5d and the first deflection mirrors 8a-8d and/or the second deflection mirrors 18a-18d arranged at positions offset against one another in the longitudinal direction X.

The measuring signals Sa, Sb, Sc, Sd are subsequently detected and evaluated together, in particular, by a central controller means 20, so that the layer thicknesses d of the pipes 2 can be measured around their entire circumference. Hereby, the extruder 3 can be regulated depending on this measurement, e.g., via the fed-in volume of the starting material 6 per unit of time and/or via an extraction velocity of the downstream extractor.

THz measuring devices in extrusion lines serve to measure a continuously extruded measuring object, in particular a string, e.g., a pipe, or a foil. A starting material is fed to an extruder as bulk material, which is then melted by the extruder and extruded through a gap, e.g., an annular gap, with the so created extruded product being discharged e.g. by means of a discharging means along a direction of transport. The THz measuring device is arranged outside the measuring object and allows for a continuous measuring, in particular, of the layer thicknesses as well as of irregularities of the extruded measuring object.

A comparative THz measuring device, wherein a THz transmission beam is introduced into the hollow space within the extruded pipe and guided along the longitudinal axis, whereby it is deflected towards the outside by a rotating mirror so as to measure properties of the pipe from within.

Thus, such a comparative THz measuring device allows a measuring of the pipe outwards from within. This should enable, in particular, early measuring of the extruded pipe even prior to running through the downstream cooling line. Coupling in the THz measuring beam from the inside aims, in particular, at reducing the space required for the comparative THz measuring device around the pipe in order to avoid problems in connection with a possibly provided calibrating device. Hereby, the rotating mirror should help to attain a measuring around the entire circumference without having to provide a costly track guide for the THz sensor device around the pipe.

A comparative device and a comparative method include a calibration measurement and a subsequent object measurement allows both a diameter and/or wall thickness and a refraction index of the material of a string to be determined.

A comparative measuring device for measuring objects using a transmitter and receiver unit for emitting and detecting radiation in an x-y plane starting from a beam point. Hereby, rectangular mirror elements are provided.

A comparative THz measuring device for measuring at least one layer thickness of a measuring object transported along a transport direction, including a main THz sensor for emitting a main THz beam along a first optical axis in a detection plane perpendicular to the transport direction and for receiving THz radiation reflected along the first optical axis, as well as including at least one additional THz sensor for emitting an additional THz beam along a second optical axis, running outside the detection plane and/or inclined with respect to the detection plane, for detecting the additional THz radiation reflected back along the second optical axis. In a signal amplitude of the additional THz sensor additional reflection peaks can be determined which are caused by imperfections in the measuring object.

A comparative THz measuring device and measuring method for detecting a material stream at two points offset against one another, including a THz transmission beam and a reflector mirror in an optical axis, wherein a measurement is taken in a further optical axis via a semi-permeable mirror.

The present disclosure is based on the object of creating a THz measuring device and a THz measuring method allowing for a secure measuring of a transported measuring object with little expense.

This task is solved by a THz measuring device and a THz measuring method according to the independent claims. The sub-claims describe preferred further developments. Further, an arrangement consisting of the THz measuring device and the extruder, preferably further including a calibration sleeve, is provided.

The following numbered clauses include embodiments that are contemplated and non-limiting:

Clause 1. A THz measuring device (5) for measuring a transported, in particular extruded, measuring object (2), the THz measuring device (5) comprising: one or more THz transceivers (5a, 5b, 5c, 5d) arranged around a longitudinal axis (A), a first mirror means (8) including one or more first deflection mirrors (8a, 8b, 8c, 8d), a second mirror means (18) being arranged offset along the longitudinal axis (A) in relation to the first mirror means (8), the second mirror means (18) including one or more second deflection mirrors (18a, 18b, 18c, 18d), each THz transceiver (5a, 5b, 5c, 5d) being configured to send a THz transmission beam (7a, 7b, 7c, 7d) along its optical axis (B), which runs perpendicular to the longitudinal axis (A), radially inwards towards a first deflection mirror (8a, 8b, 8c, 8d) each, in such a manner that the THz transmission beam (7a, 7b, 7c, 7d)
is reflected at the first deflection mirror (8a, 8b, 8c, 8d) and runs along the longitudinal axis (A) as a lengthwise running transmitted beam (17a, 17b, 17c, 17d) and is subsequently reflected at a second deflection mirror (18a, 18b, 18c, 18d) in a direction radially outwards as a radial reflected beam (27a, 27b, 27c, 27d) and
is deflected, in a direction perpendicular to the longitudinal axis (A), and, following an inwards reflection, is subsequently reflected back via the second mirror means (18) and the first mirror means (8) towards the respective THz transceiver (5a, 5b, 5c, 5d), the THz transceiver (5a, 5b, 5c, 5d) supplying a measuring signal (Sa, SB, Sc, Sd), the THz measuring device (5) being configured to determine a property of the measuring object (2) from the measurement signals of the THz transceivers (5a, 5b, 5c, 5d), the property of the measuring object (2) being one or more elements of the group consisting of:
a layer thickness (d) of the measuring object (2) at various locations of the longitudinal axis (A) and/or various locations on the circumference,
a refraction index (n2) of the measuring object (2),
inclusions of air and other substances inside the measuring object (2)
irregular formation of boundary surfaces (2-1, 2-2), and
formation of boundary surfaces (2-1, 2-2) of the measuring object (2) that are non-parallel to the longitudinal axis (A).

Clause 2. The THz measuring device (5) according to clause 1, wherein it comprises four or more THz transceivers (5a, 5b, 5c, 5d) arranged in a manner distributed in a circumferential direction around
the measuring object (2), and/or
the longitudinal axis (A), the longitudinal axis (A) being provided in a central position.

Clause 3. The THz measuring device (5) according to one of the above clauses, wherein one or more element of the following group are arranged statically, the group consisting of:

the THz transceivers, the first deflection mirrors (8a-8d), and the second deflection mirrors (18a-18d).

Clause 4. The THz measuring device (5) according to one of the above clauses, wherein the THz transceivers (5a, 5b, 5c, 5d) each emit a THz transmission beam (7a-7d) within a frequency range between 10 GHz and 50 THz, in particular 10 GHz and 10 THz, in particular 20 GHz and 3 THz, preferably 50 GHz and 1 THz GHz and 10 THz, Clause 5. The THz measuring device (5) according to clause 4, wherein the THz transmission beams emitted by the THz transceivers are provided for a time-of-flight measurement and/or by using frequency modulation and/or as pulsed radiation.

Clause 6. The THz measuring device (5) according to one of the above clauses, wherein the lengthwise running transmitted beams (17a, 17b, 17c, 17d) run offset in relation to the longitudinal axis (A), e.g. offset in a parallel manner.

Clause 7. The THz measuring device (5) according to one of the above clauses, wherein the THz transmission beams (7a, 7b, 7c, 7d) run perpendicular to the longitudinal axis (A).

Clause 8. The THz measuring device (5) according to one of the above clauses, wherein the radial reflected beams (27a, 27b, 27c, 27d) run perpendicular to the longitudinal axis (A) or run at an out-coupling angle at which they are reflected back to the second mirror array.

Clause 9. The THz measuring device (5) according to one of the above clauses, wherein the first deflection mirrors (8a-8e) and/or the second deflection mirrors (18a-18d) each run at an angle of 45° both in relation to the longitudinal axis (A) and to the THz transmission beam (7a-7d), each deflection mirror comprising a planar, non-curved surface.

Clause 10. The THz measuring device (5) according to one of the above clauses, wherein the first deflection mirrors (8a-8e) and/or the second deflection mirrors (18a-18d) each run at an angle of 45° in relation to the radial reflected beams (27a-27d).

Clause 11. The THz measuring device (5) according to one of the above clauses, wherein the first mirror means (8) and/or the second mirror means (18) are received at a common holding device, e.g. a supporting rod (12) extending in the longitudinal axis (A).

Clause 12. The THz measuring device (5) according to one of the above clauses, wherein the first deflection mirrors (8a-8d) of the first mirror means (8) are arranged in a common first measuring plane (P1), and/or the second deflection mirrors (18a-18d) of the second mirror means (18) are arranged in a common second measuring plane (P2).

Clause 13. The THz measuring device (5) according to one of the clauses 1 through 7, wherein
at least part of the second deflection mirrors (18a-18d) are arranged offset against one another in the direction of the longitudinal axis (A), preferably without forming a common second measuring plane P2,
and/or
at least part of the first deflection mirrors (8a-8d) are arranged offset against one another along the longitudinal axis (A), preferably without forming a common first measuring plane (P1).

Clause 14. The THz measuring device (5) according to one of the above clauses, wherein
it further comprises a third mirror means (28) arranged radially outside the second mirror means (18),
such that the third mirror means (28) reflects the radial reflected beam (27a, 27b, 27c, 27d), reflected radially outwards perpendicular to the longitudinal axis (A) at a second deflection mirror (18a, 18b, 18c, 18d) each, back to the second deflection mirrors (18a, 18b, 18c, 18d) of the second mirror means (18), the third mirror means (28) reflecting the THz transmission beam, in particular, each via the second deflection mirror (18a, 18b, 18c, 18d) to the first mirror means (8) and to the respective THz transceiver (5a, 5b, 5c, 5d).

Clause 15. The THz measuring device (5) according to clause 14, wherein the third mirror means (28) is arranged on the interior surface of a calibration sleeve (4) of the extruder device.

Clause 16. The THz measuring device (5) according to one of the clauses 1 through 14, wherein the third mirror means (28) is formed at a reference hood (14) which is arranged radially outside a transport area for the measuring object (2).

Clause 17. The THz measuring device (5) according to one of the above clauses, wherein the two mirror means (18) are arranged at differing distances from the extruder (3) in the transport direction (T).

Clause 18. The THz measuring device (5) according to one of the above clauses, wherein the longitudinal axis (A) is the longitudinal axis (A) of the THz measuring device (5) and/or of the extruder.

Clause 19. The THz measuring device (5) according to one of the above clauses, wherein a controller unit (20) determines both layer thicknesses (d) and the refraction index (n2) of the measuring object (2) from a calibration measurement without a measuring object (2) and the subsequent measurements with a traversing extruded measuring object (2).

Clause 20. Arrangement (1) comprising a The THz measuring device (5) according to one of the above clauses, the measuring object (2), and an extruder (3) for receiving starting material (6) and putting out the extruded measuring object (2).

Clause 21. Arrangement (1) according to clause 20, wherein it further comprises a calibration sleeve (4) for calibrating the extruded measuring object (2), the mirror means (28) being affixed to an interior side of the calibration sleeve (4) or at the calibration sleeve (4).

Clause 22. THz measuring method for measuring an extruded measuring object, in particular an extruded string, e.g. pipe (2), or an extruded blow film, including the following steps:

arranging or providing a THz measuring device (5) including one or more THz transceivers (5a, 5b, 5c, 5d) arranged around a longitudinal axis (A) of an extruder (3), where the extruder (3) continuously extrudes a measuring object (2) along the longitudinal axis (A) in a transport direction (T), the THz transceivers (5a, 5b, 5c, 5d) each putting out a THz transmission beam (7a, 7b, 7c, 7c) along their respective optical axis (B) perpendicular to the longitudinal axis (A) inwards through the extruded measuring object (2), the THz transmission beams (7a-7d) subsequently being reflected each at a first deflection mirror (8a-8d) of a first mirror means (8) such that they run along the longitudinal axis (A), the THz transmission beams (7a-7d) subsequently being reflected at a second mirror means (18) including one or more second deflection mirrors (18a-18d) such that they run as radial reflected beams (27a, 27b, 27c, 27d) perpendicular to the longitudinal axis (A) radially outwards and pass through the measuring object (2) towards the outside, the THz-transmitted beams subsequently being reflected from the outside back towards the inside through the measuring object (2) back to the second mirror means (18), the first mirror means (8) and the THz transceivers (5a-5d), wherein one or more properties of the extruded measuring object (2) being determined from measuring signals (Sa, Sb, Sc, Sd) of the THz transceivers (5a-5d), the properties being selected from the group consisting of:

a layer thickness (d) of the measuring object (2) at various locations of the longitudinal axis (A) and/or various circumferential locations, a refraction index (n2) of the measuring object (2), inclusions of air and other substances in the measuring object (2)

irregular formation of boundary surfaces (2-1, 2-2), and formation of boundary surfaces (2-1, 2-2) of the measuring object (2) running non-parallel to the longitudinal axis (A).

Clause 23. Method according to clause 22, wherein the radial reflected beams (27a, 27b, 27c, 27d) reflected from the second mirror means (18) outwards through the measuring object (2) are subsequently reflected by a third mirror means (28) back to the second mirror means (18), and subsequently reflected to the first mirror means (8) and the THz transceivers (5a-5d).

Clause 24. Method according to clause 22 or 23, wherein firstly a calibration measurement is carried out without the measuring object (2), e.g. prior to commencement of production, and subsequently THz measurements are carried out with a traversing extruded measuring object (2), and at least one layer thickness (d) as well as a refraction index (n2) of the measuring object es (2) is determined from a comparison of the calibration measurement to the subsequent THz measurements of the traversing measuring object (2).

The invention claimed is:

1. A Terahertz (THz) measuring device for measuring a transported, in particular extruded, measuring object, the Terahertz (THz) measuring device comprising:

one or more Terahertz (THz) transceivers arranged around a longitudinal axis, a first mirror means including one or more first deflection mirrors, a second mirror means being arranged offset along the longitudinal axis (A) in relation to the first mirror means, the second mirror means including one or more second deflection mirrors, each Terahertz (THz) transceiver being configured to send a Terahertz (THz) transmission beam along its optical axis, which runs perpendicular to the longitudinal axis, radially inwards towards a first deflection mirror each, in such a manner that the Terahertz (THz) transmission beam is reflected at the first deflection mirror and runs along the longitudinal axis as a lengthwise running transmitted beam and is subsequently reflected at a second deflection mirror in a direction radially outwards as a radial reflected beam and is deflected, in a direction perpendicular to the longitudinal axis, and, following an inwards reflection, is subsequently reflected back via the second mirror means and the first mirror means towards the respective Terahertz (THz) transceiver, the Terahertz (THz) transceiver supplying a measuring signal, the Terahertz (THz) measuring device being configured to determine a property of the measuring object from the measurement signals of the Terahertz (THz) transceivers, the property of the measuring object being one or more elements of the group consisting of:
a layer thickness of the measuring object at various locations of the longitudinal axis and/or various locations on the circumference,
a refraction index of the measuring object,
inclusions of air and other substances inside the measuring object
irregular formation of boundary surfaces, and
formation of boundary surfaces of the measuring object that are non-parallel to the longitudinal axis.

2. The Terahertz (THz) measuring device of claim 1, further comprising four or more Terahertz (THz) transceivers arranged in a manner distributed in a circumferential direction around
the measuring object, and/or
the longitudinal axis, the longitudinal axis being provided in a central position.

3. The Terahertz (THz) measuring device of claim 1, wherein one or more element of the following group are arranged statically, the group consisting of:
the Terahertz (THz) transceivers, the first deflection mirrors, and the second deflection mirrors.

4. The Terahertz (THz) measuring device of claim 1, wherein the Terahertz (THz) transceivers each emit a Terahertz (THz) transmission beam within a frequency range between 10 Gigahertz (GHz) and 50 Terahertz (THz), in particular 10 Gigahertz (GHz) and 10 Terahertz (THz), in particular 20 Gigahertz (GHz) and 3 Terahertz (THz), preferably 50 Gigahertz (GHz) and 1 Terahertz (THz) Gigahertz (GHz) and 10 Terahertz (THz).

5. The Terahertz (THz) measuring device of claim 4, wherein the Terahertz (THz) transmission beams emitted by the Terahertz (THz) transceivers are provided for a time-of-flight measurement and/or by using frequency modulation and/or as pulsed radiation.

6. The Terahertz (THz) measuring device of claim 1, wherein the lengthwise running transmitted beams run offset in relation to the longitudinal axis, e.g. offset in a parallel manner.

7. The Terahertz (THz) measuring device of claim 1, wherein the Terahertz (THz) transmission beams run perpendicular to the longitudinal axis.

8. The Terahertz (THz) measuring device of claim 1, wherein the radial reflected beams run perpendicular to the longitudinal axis or run at an out-coupling angle at which they are reflected back to the second mirror array.

9. The Terahertz (THz) measuring device of claim 1, wherein the first deflection mirrors and/or the second deflection mirrors each run at an angle of 45° both in relation to the longitudinal axis and to the Terahertz (THz) transmission beam, each deflection mirror comprising a planar, non-curved surface.

10. The Terahertz (THz) measuring device of claim 1, wherein the first deflection mirrors and/or the second deflection mirrors each run at an angle of 45° in relation to the radial reflected beams.

11. The Terahertz (THz) measuring device of claim 1, wherein the first mirror means and/or the second mirror means are received at a common holding device, e.g. a supporting rod extending in the longitudinal axis.

12. The Terahertz (THz) measuring device of claim 1, wherein the first deflection mirrors of the first mirror means are arranged in a common first measuring plane, and/or the second deflection mirrors of the second mirror means are arranged in a common second measuring plane.

13. The Terahertz (THz) measuring device of claim 1, wherein at least part of the second deflection mirrors are arranged offset against one another in the direction of the longitudinal axis, preferably without forming a common second measuring plane,
and/or at least part of the first deflection mirrors are arranged offset against one another along the longitudinal axis, preferably without forming a common first measuring plane.

14. The Terahertz (THz) measuring device of claim 1, further comprising a third mirror means arranged radially outside the second mirror means, such that the third mirror means reflects the radial reflected beam, reflected radially outwards perpendicular to the longitudinal axis at a second deflection mirror each, back to the second deflection mirrors of the second mirror means, the third mirror means reflecting the Terahertz (THz) transmission beam, in particular, each via the second deflection mirror to the first mirror means and to the respective Terahertz (THz) transceiver.

15. The Terahertz (THz) measuring device of claim 14, wherein the third mirror means is arranged on the interior surface of a calibration sleeve of the extruder device.

16. The Terahertz (THz) measuring device of claim 1, wherein the third mirror means is formed at a reference hood which is arranged radially outside a transport area for the measuring object.

17. The Terahertz (THz) measuring device of claim 1, wherein the two mirror means are arranged at differing distances from the extruder in the transport direction.

18. The Terahertz (THz) measuring device of claim 1, wherein the longitudinal axis is the longitudinal axis of the Terahertz (THz) measuring device and/or of the extruder.

19. The Terahertz (THz) measuring device of claim 1, wherein a controller unit determines both layer thicknesses and the refraction index of the measuring object from a calibration measurement without a measuring object and the subsequent measurements with a traversing extruded measuring object.

20. An arrangement comprising the Terahertz (THz) measuring device according to claim 1, the measuring object, and an extruder for receiving starting material and putting out the extruded measuring object.

21. The arrangement of claim 20, wherein it further comprises a calibration sleeve for calibrating the extruded measuring object, the mirror means being affixed to an interior side of the calibration sleeve or at the calibration sleeve.

22. A Terahertz (THz) measuring method for measuring an extruded measuring object, in particular an extruded string, e.g. pipe, or an extruded blow film,
including the following steps:
arranging or providing a Terahertz (THz) measuring device including one or more Terahertz (THz) transceivers arranged around a longitudinal axis of an extruder, where the extruder continuously extrudes a measuring object along the longitudinal axis in a transport direction, the Terahertz (THz) transceivers each putting out a Terahertz (THz) transmission beam along their respective optical axis perpendicular to the longitudinal axis inwards through the extruded measuring object, the Terahertz (THz) transmission beams subsequently being reflected each at a first deflection mirror of a first mirror means such that they run along the longitudinal axis,
the Terahertz (THz) transmission beams subsequently being reflected at a second mirror means including one or more second deflection mirrors such that they run as radial reflected beams perpendicular to the longitudinal axis radially outwards and pass through the measuring object towards the outside, the Terahertz (THz)-transmitted beams subsequently being reflected from the outside back towards the inside through the measuring object back to the second mirror means, the first mirror means and the Terahertz (THz) transceivers, wherein one or more properties of the extruded measuring object being determined from measuring signals of the Terahertz (THz) transceivers, the properties being selected from the group consisting of:
- a layer thickness of the measuring object at various locations of the longitudinal axis and/or various circumferential locations,
- a refraction index of the measuring object,
- inclusions of air and other substances in the measuring object
- irregular formation of boundary surfaces, and
- formation of boundary surfaces of the measuring object running non-parallel to the longitudinal axis.

23. The Terahertz (THz) measuring method of claim 22, wherein the radial reflected beams reflected from the second mirror means outwards through the measuring object are subsequently reflected by a third mirror means back to the second mirror means, and subsequently reflected to the first mirror means and the Terahertz (THz) transceivers.

24. The Terahertz (THz) measuring method of claim 22, wherein firstly a calibration measurement is carried out without the measuring object, e.g. prior to commencement of production, and subsequently Terahertz (THz) measurements are carried out with a traversing extruded measuring object, and at least one layer thickness as well as a refraction index of the measuring object is determined from a comparison of the calibration measurement to the subsequent Terahertz (THz) measurements of the traversing measuring object.

* * * * *